US012570909B2

(12) United States Patent
Zhang et al.

(10) Patent No.: US 12,570,909 B2
(45) Date of Patent: Mar. 10, 2026

(54) PROCESS FOR HYDROISOMERISING A HYDROCARBON FEED

(71) Applicant: CHEVRON U.S.A. INC., San Ramon, CA (US)

(72) Inventors: Yihua Zhang, Albany, CA (US); Guan-Dao Lei, Walnut Creek, CA (US); Adeola Florence Ojo, Pleasant Hill, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 141 days.

(21) Appl. No.: 18/269,239

(22) PCT Filed: Dec. 20, 2021

(86) PCT No.: PCT/US2021/064266
§ 371 (c)(1),
(2) Date: Jun. 22, 2023

(87) PCT Pub. No.: WO2022/146732
PCT Pub. Date: Jul. 7, 2022

(65) Prior Publication Data

US 2024/0076560 A1 Mar. 7, 2024

Related U.S. Application Data

(63) Continuation of application No. 17/138,223, filed on Dec. 30, 2020, now abandoned.

(51) Int. Cl.
*C10G 45/64* (2006.01)
*B01J 29/76* (2006.01)

(52) U.S. Cl.
CPC .......... *C10G 45/64* (2013.01); *B01J 29/7661* (2013.01); *C10G 2300/80* (2013.01)

(58) Field of Classification Search
CPC ............................................... C10G 45/58-66
See application file for complete search history.

(56) References Cited

U.S. PATENT DOCUMENTS

| | | | |
|---|---|---|---|
| 5,419,830 | A | 5/1995 | Chou et al. |
| 5,905,181 | A | 5/1999 | Galperin |
| 2011/0315597 | A1 | 12/2011 | Krishna et al. |
| 2017/0058209 | A1 | 3/2017 | Ojo et al. |

OTHER PUBLICATIONS

International Search Report, issued on Apr. 20, 2022, during the prosecution of International Application No. PCT/US2021/064266.
Written Opinion of the International Searching Authority, issued on Apr. 20, 2022, during the prosecution of International Application No. PCT/US2021/064266.

*Primary Examiner* — Renee Robinson
(74) *Attorney, Agent, or Firm* — Mark Warzel

(57) ABSTRACT

Described herein is a process for hydroisomerising a hydrocarbon feed. The process may comprise: combining a hydrocarbon feed and a hydroisomerisation additive to provide a combined feed; and contacting the combined feed with a hydroisomerisation catalyst comprising zeolite SSZ-91, where the hydroisomerisation additive is a substituted or unsubstituted nitrogen heterocycle.

20 Claims, 1 Drawing Sheet

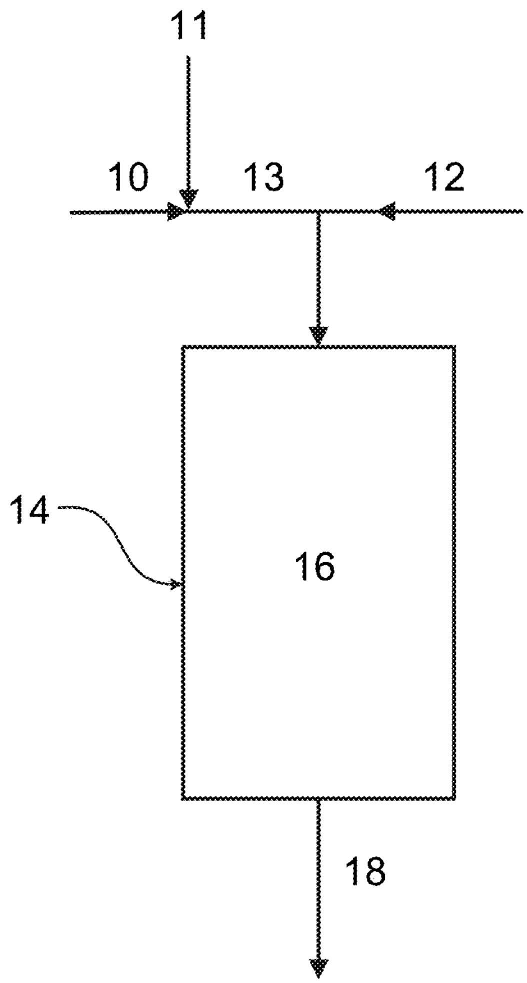
11
10
13
12
14
16
18

PROCESS FOR HYDROISOMERISING A HYDROCARBON FEED

CROSS REFERENCE TO RELATED APPLICATIONS

This application is related to the following applications, and claims the benefit of priority thereto, as a 371 application of PCT/US2021/064266, filed on Dec. 20, 2021; which is a continuation of U.S. patent application Ser. No. 17/138,223, filed on Dec. 30, 2020, the disclosures of which are herein incorporated in their entirety.

TECHNICAL FIELD

Described herein is a new process for hydroisomerising a hydrocarbon feed using a hydroisomerisation additive.

BACKGROUND

Hydroisomerisation is a process which increases the ratio of iso-paraffins to n-paraffins as a hydrocarbon feed is hydroisomerised. Therefore, hydroisomerisation is employed to upgrade hydrocarbon feeds to provide base oils with improved properties such as lower pour points compared to the hydrocarbon feeds from which they are derived. Hydroisomerisation catalysts comprise molecular sieves, the pores of the molecular sieves determine the size and shape of molecules which can enter the molecular sieve.

There is an ongoing need to develop new and improved hydroisomerisation processes.

SUMMARY

This present invention relates to processes for improving the yield of base oil produced by hydroisomerising a hydrocarbon feed. The present invention is based on the inventors' surprising finding that adding a nitrogen heterocycle as a hydroisomerisation additive to a hydrocarbon feed improves the yield of a base oil produced by contacting the hydrocarbon feed with a hydroisomerisation catalyst comprising zeolite SSZ-91.

According to a first aspect, there is provided a process for hydroisomerising a hydrocarbon feed, the process comprising:

- combining a hydrocarbon feed and a hydroisomerisation additive to provide a combined feed; and
- contacting the combined feed with a hydroisomerisation catalyst, wherein the hydroisomerisation additive is a substituted or unsubstituted nitrogen heterocycle, and the hydroisomerisation catalyst comprises zeolite SSZ-91.

According to a second aspect, there is provided a process for increasing the yield of a base oil produced by hydroisomerising a hydrocarbon feed, the process comprising:

- combining a hydrocarbon feed and a hydroisomerisation additive to provide a combined feed; and
- contacting the combined feed with a hydroisomerisation catalyst comprising zeolite SSZ-91 to form a base oil product, wherein the hydroisomerisation additive is a substituted or unsubstituted nitrogen heterocycle, and the yield of the base oil product is improved by at least 1.0 wt. % compared to the process conducted in the absence of the hydroisomerisation additive.

According to a third aspect, there is provided the use of a hydroisomerisation additive to improve the yield of a base oil produced by contacting hydrocarbon feed and a hydroisomerisation catalyst, by combining the hydrocarbon feed with the hydroisomerisation additive to form a combined feed before contacting the combined feed and the hydroisomerisation catalyst, wherein the hydroisomerisation additive is a substituted or unsubstituted nitrogen heterocycle, and the hydroisomerisation catalyst comprises zeolite SSZ-91.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

FIG. 1 schematically represents a process for hydroisomerising hydrocarbon feeds according to an embodiment of the present invention.

DETAILED DESCRIPTION

Introduction

The term "nitrogen heterocycle" as used herein refers to a heterocyclic compound containing at least one nitrogen heteroatom occupying a ring position. In embodiments, the heteroatom(s) contained in the nitrogen heterocycle consist of nitrogen. In embodiments, the nitrogen heterocycle contains a single heteroatom only, the single heteroatom being nitrogen.

The term "double bond equivalent" or "DBE" as used herein refers to the number of molecules of $H_2$ that would have to be added to a given molecule (for example to a nitrogen heterocycle as described herein) to convert all of the pi bonds of the molecule to single bonds, and all of the rings to acyclic structures. The DBE (double bond equivalent) number can be determined from the molecular formula using the following equation:

$$DBE=C-(H/2)+(N/2)+1$$

where: C is the number of carbon atoms, H is the number of hydrogen atoms, and N is the number of nitrogen atoms is the molecule. For example, a DBE number of 1 corresponds to one ring or one double bond, a DBE number of 2 corresponds to two rings, two double bonds, one triple bond, or one ring plus one double bond. For example, carbazole has a DBE number of 9 (one for each of the three rings and one for each of the three double bonds), ethyl carbazole also has a DBE number of 9 (one for each of the three rings and one for each of the three double bonds).

As used herein, the term "pour point" as used herein refers to the temperature at which an oil, for example a hydrocarbon feed as described herein, will begin to flow under controlled conditions. The pour point may be determined in accordance by ASTM D5950.

Unless otherwise specified, the "feed rate" of a hydrocarbon feed being fed to a catalytic reaction zone is expressed herein as the volume of feed per volume of catalyst per hour, which may be referred to as liquid hourly space velocity (LHSV) with units of reciprocal hours ($h^{-1}$).

The term "*MRE-type molecular sieve" and "EUO-type molecular sieve" includes all molecular sieves and their isotypes that have been assigned the International Zeolite Association framework, as described in the *Atlas of Zeolite Framework Types*, eds. Ch. Baerlocher, L. B. McCusker and D. H. Olson, Elsevier, $6^{th}$ revised edition, 2007 and the Database of Zeolite Structures on the International Zeolite Association's website (http://www.iza-online.org).

"Group 2, 8, 9 and 10 metals" refers to elemental metal(s) selected from Groups 2, 8, 9 and 10 of the Periodic Table of the Elements and/or to metal compounds comprising such metal(s).

The term "Periodic Table" refers to the version of IUPAC Periodic Table of the Elements dated 1 Dec. 2018.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof. In addition, all number ranges presented herein are inclusive of their upper and lower limit values.

If a standard test is mentioned herein, unless otherwise stated, the version of the test to be referred to is the most recent at the time of filing this patent application.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

Hydroisomerisation Additive

Described herein is a hydroisomerisation additive which may be introduced into a hydrocarbon feed prior to hydroisomerisation of the hydrocarbon feed using a hydroisomerisation catalyst. The addition of the hydroisomerisation additive to the hydrocarbon feed has surprisingly been found to increase the yield of the hydroisomerised base oil product produced by the hydroisomerisation process described herein.

The hydroisomerisation additive is a substituted or unsubstituted nitrogen heterocycle. In embodiments, the substituted or unsubstituted nitrogen heterocycle is a substituted or unsubstituted aromatic nitrogen heterocycle.

In embodiments, the hydroisomerisation additive has a double bond equivalent (DBE) number in the range of 3 to 10, for example 4 to 10, 6 to 10, 7 to 10, 8 to 10, or 7 to 9. In embodiments, the hydroisomerisation additive has a double bond equivalent (DBE) number of 9.

In embodiments, the hydroisomerisation additive has a molecular weight of less than about 600, for example less than about 500, less than about 250, or less than about 200. In embodiments, the hydroisomerisation additive, has a molecular weight in the range of about 60 to about 600, for example about 60 to about 250.

In embodiments, the hydroisomerisation additive is selected from: substituted or unsubstituted tricyclic fused-ring aromatic nitrogen heterocycles (for example, substituted or unsubstituted 11 to 14 membered tricyclic fused-ring aromatic heterocycles); substituted or unsubstituted bicyclic fused-ring aromatic nitrogen heterocycles (for example, substituted or unsubstituted 8 to 10 membered bicyclic fused-ring aromatic heterocycles); and single ring aromatic nitrogen heterocycles (for example, substituted or unsubstituted 5 or 6 membered bicyclic fused-ring aromatic heterocycles). In embodiments, the hydroisomerisation additive is selected from substituted or unsubstituted carbazoles, substituted or unsubstituted pyrroles, substituted or unsubstituted pyridines, substituted or unsubstituted indoles, substituted or unsubstituted quinolines, and substituted or unsubstituted acridines. In embodiments, the hydroisomerisation additive is a substituted or unsubstituted carbazole. In embodiments, the hydroisomerisation additive is a substituted carbazole. In embodiments, the hydroisomerisation additive is N-ethyl carbazole.

In embodiments, the hydroisomerisation additive is a substituted nitrogen heterocycle (for example a substituted aromatic nitrogen heterocycle) which is substituted with one or more substituents independently selected from: alkyl; hydroxyl; alkoxy; carboxyl; and —NR'R", wherein R' and R" are independently H or alkyl. In embodiments, the hydroisomerisation additive is a substituted nitrogen heterocycle (for example a substituted aromatic nitrogen heterocycle) which is substituted with one or more substituents independently selected from: $C_{1-10}$ alkyl; hydroxyl; $C_{1-10}$ alkoxy; $C_{1-10}$ carboxyl; and —NR'R", wherein R' and R" are independently H or $C_{1-10}$ alkyl. In embodiments, the hydroisomerisation additive is a substituted nitrogen heterocycle (for example a substituted aromatic nitrogen heterocycle) which is substituted with one or more substituents independently selected from: $C_{1-6}$alkyl, hydroxyl, $C_{1-6}$ alkoxy, $C_{1-6}$ carboxyl and —NR'R", wherein R' and R" are independently H or $C_{1-6}$ alkyl. In embodiments, the hydroisomerisation additive is a substituted nitrogen heterocycle (for example a substituted aromatic nitrogen heterocycle) which is substituted with one or more substituents independently selected from: $C_{1-4}$ alkyl, hydroxyl, $C_{1-4}$ alkoxy, $C_{1-4}$ carboxyl and —NR'R", wherein R' and R" are independently H or $C_{1-4}$ alkyl. In embodiments, the hydroisomerisation additive is a substituted nitrogen heterocycle (for example a substituted aromatic nitrogen heterocycle) which is substituted with one or more substituents independently selected from $C_{1-10}$ alkyl. In embodiments, the hydroisomerisation additive is a substituted nitrogen heterocycle (for example a substituted aromatic nitrogen heterocycle) which is substituted with one or more substituents independently selected from $C_{1-6}$ alkyl. In embodiments, the hydroisomerisation additive is a substituted nitrogen heterocycle (for example a substituted aromatic nitrogen heterocycle) which is substituted with one or more substituents independently selected from $C_{1-4}$ alkyl.

In embodiments, the hydroisomerisation additive is an unsubstituted nitrogen heterocycle (for example an unsubstituted aromatic nitrogen heterocycle).

In embodiments, the hydroisomerisation additive is a substituted or unsubstituted aromatic nitrogen heterocycle according to formula I:

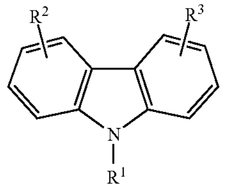

(I)

wherein $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen, $C_{1-10}$ alkyl, hydroxyl, $C_{1-10}$ alkoxy, $C_{1-10}$ carboxyl and —NR'R", where R' and R" are independently H or $C_{1-10}$ alkyl.

In embodiments, $R^1$ is selected from hydrogen, $C_{1-10}$ alkyl, hydroxyl, $C_{1-10}$ alkoxy, $C_{1-10}$ carboxyl. In embodiments, $R^1$ is selected from hydrogen, $C_{1-6}$ alkyl, hydroxyl, $C_{1-6}$ alkoxy, $C_{1-6}$ carboxyl. In embodiments, $R^1$ is selected from hydrogen, $C_{1-4}$ alkyl, hydroxyl, $C_{1-4}$ alkoxy, $C_{1-4}$ carboxyl. In embodiments, $R^1$ is selected from hydrogen and $C_{1-10}$ alkyl. In embodiments, $R^1$ is selected from hydrogen and $C_{1-6}$ alkyl. In embodiments, $R^1$ is selected from hydrogen and $C_{1-4}$ alkyl. In embodiments, $R^1$ is $C_{1-10}$ alkyl. In embodiments, $R^1$ is $C_{1-6}$ alkyl. In embodiments, $R^1$ is $C_{1-4}$ alkyl.

In embodiments, $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^2$ and $R^3$ are independently selected from hydrogen, $C_{1-6}$ alkyl, hydroxyl, $C_{1-6}$ alkoxy, $C_{1-6}$ carboxyl and —NR'R" where R' and R" are independently H or $C_{1-6}$ alkyl. In embodiments, $R^2$ and $R^3$ are independently selected from hydrogen, $C_{1-4}$ alkyl, hydroxyl, $C_{1-4}$ alkoxy, $C_{1-4}$ carboxyl and —NR'R" where R' and R" are independently H or $C_{1-4}$ alkyl. In embodiments, $R^2$ and $R^3$ are independently selected from hydrogen and $C_{1-10}$ alkyl. In embodiments, $R^2$ and $R^3$ are independently selected from hydrogen and $C_{1-6}$ alkyl. In embodiments, $R^2$ and $R^3$ are independently selected from hydrogen and $C_{1-4}$ alkyl. In embodiments, $R^2$ and $R^3$ are hydrogen.

In embodiments, $R^1$ is selected from hydrogen, $C_{1-6}$ alkyl, hydroxyl, $C_{1-6}$ alkoxy, $C_{1-6}$ carboxyl; and $R^2$ and $R^3$ are independently selected from hydrogen, $C_{1-6}$ alkyl, hydroxyl, $C_{1-6}$ alkoxy, $C_{1-6}$ carboxyl and —NR'R" where R' and R" are independently H or $C_{1-6}$ alkyl. In embodiments, $R^1$ is selected from hydrogen, $C_{1-4}$ alkyl, hydroxyl, $C_{1-4}$ alkoxy, $C_{1-4}$ carboxyl; and $R^2$ and $R^3$ are independently selected from hydrogen, $C_{1-4}$ alkyl, hydroxyl, $C_{1-4}$ alkoxy, $C_{1-4}$ carboxyl and —NR'R" where R' and R" are independently H or $C_{1-4}$ alkyl. In embodiments, $R^1$ is selected from hydrogen and $C_{1-10}$ alkyl; and $R^2$ and $R^3$ are independently selected from hydrogen and $C_{1-10}$ alkyl. In embodiments, $R^1$ is selected from hydrogen and $C_{1-6}$ alkyl; and $R^2$ and $R^3$ are independently selected from hydrogen and $C_{1-6}$ alkyl. In embodiments, $R^1$ is selected from hydrogen and $C_{1-4}$ alkyl; and $R^2$ and $R^3$ are independently selected from hydrogen and $C_{1-4}$ alkyl. In embodiments, $R^1$ is $C_{1-10}$ alkyl; and $R^2$ and $R^3$ are hydrogen. In embodiments, $R^1$ is $C_{1-6}$ alkyl; and $R^2$ and $R^3$ are hydrogen. In embodiments, $R^1$ is $C_{1-4}$ alkyl; and $R^2$ and $R^3$ are hydrogen. In embodiments, $R^1$ is $C_{1-3}$ alkyl; and $R^2$ and $R^3$ are hydrogen. In embodiments, $R^1$ is $C_{1-2}$ alkyl; and $R^2$ and $R^3$ are hydrogen. In embodiments, $R^1$ is $C_2$ alkyl; and $R^2$ and $R^3$ are hydrogen.

In embodiments, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen, $C_{1-6}$ alkyl, hydroxyl, $C_{1-6}$ alkoxy, $C_{1-6}$ carboxyl and —NR'R" where R' and R" are independently H or $C_{1-6}$ alkyl. In embodiments, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen, $C_{1-4}$ alkyl, hydroxyl, $C_{1-4}$ alkoxy, $C_{1-4}$ carboxyl and —NR'R" where R' and R" are independently H or $C_{1-4}$ alkyl. In embodiments, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen and $C_{1-10}$ alkyl. In embodiments, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen and $C_{1-6}$ alkyl. In embodiments, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen and $C_{1-4}$ alkyl. In embodiments, $R^1$ is selected from hydrogen, $C_{1-10}$ alkyl, hydroxyl, $C_{1-10}$ alkoxy, $C_{1-10}$ carboxyl; and $R^2$ and $R^3$ are hydrogen.

In embodiments, $R^1$ is selected from hydrogen, $C_{1-6}$ alkyl, hydroxyl, $C_{1-6}$ alkoxy, $C_{1-6}$ carboxyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^1$ is selected from hydrogen, $C_{1-4}$ alkyl, hydroxyl, $C_{1-4}$ alkoxy, $C_{1-4}$ carboxyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^1$ is selected from hydrogen and $C_{1-10}$ alkyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^1$ is selected from hydrogen and $C_{1-6}$ alkyl. In embodiments, $R^1$ is selected from hydrogen and $C_{1-4}$ alkyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^1$ is $C_{1-10}$ alkyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^1$ is $C_{1-6}$ alkyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl. In embodiments, $R^1$ is $C_{1-4}$ alkyl; and $R^2$ and $R^3$ are independently selected from hydrogen, $C_{1-10}$ alkyl, hydroxyl, $C_{1-10}$ alkoxy, $C_{1-10}$ carboxyl and —NR'R" where R' and R" are independently H or $C_{1-10}$ alkyl.

Hydroisomerisation Catalyst

In embodiments, the hydroisomerisation catalyst comprises zeolite SSZ-91.

In embodiments, the hydroisomerisation catalyst comprises from about 5 to about 95 wt. % zeolite SSZ-91 by total weight of the hydroisomerisation catalyst, for example from about 10 to about 95 wt. % zeolite SSZ-91, from about 20 to about 90 wt. % zeolite SSZ-91, from about 25 to about 85 wt. % zeolite SSZ-91, from about 30 to about 80 wt. % zeolite SSZ-91, from about 35 to about 75 wt. % zeolite SSZ-91, from about 35 to about 55 wt. % zeolite SSZ-91, from about 45 to about 75 wt. % zeolite SSZ-91, or from about 55 to about 75 wt. % zeolite SSZ-91 by total weight of the hydroisomerisation catalyst.

The hydroisomerisation catalyst further comprises a metal modifier, for example a metal modifier selected from Group 2, 8, 9 and 10 metals or combinations thereof. In embodiments, the metal modifier is selected from Group 8, 9 or 10 metals and combinations thereof, for example the metal modifier may be selected from Fe, Co, Ni, Ru, Rh, Pd, Os, Ir, Pt and combinations thereof. In embodiments, the metal modifier is selected from Group 10 metals and combinations thereof. In embodiments, the hydroisomerisation catalyst comprises platinum.

In embodiments, the hydroisomerisation catalyst comprises from about 0.05 to about 2.0 wt. % of a metal modifier (e.g., a Group 8, 9 or 10 metal, for example a Group 10 metal such as platinum) by total weight of the hydroisomerisation catalyst, for example, about 0.1 to about 1.5 wt. %, or about 0.2 to about 1.5 wt. %, or about 0.1 to about 1 wt. %, by total weight of the hydroisomerisation catalyst.

In embodiments, the hydroisomerisation catalyst comprises an oxide binder. In embodiments, the oxide binder is an inorganic oxide. In embodiments, the hydroisomerisation catalyst comprises an oxide binder selected from alumina, silica, ceria, titania, tungsten oxide, zirconia and combinations thereof. In embodiments, the hydroisomerisation catalyst comprises an oxide binder comprising alumina. Suitable aluminas are commercially available, including, e.g., Catapal® aluminas and Pural® aluminas from Sasol® or Versal® aluminas from UOP®. In general, the alumina can be any alumina known for use as a matrix material in a catalyst base. For example, the alumina can be boehmite, bayerite, γ-alumina, η-alumina, θ-alumina, δ-alumina, χ-alumina, or a mixture thereof. In embodiments, the hydroisomerisation catalyst comprises from about 5 to about 95 wt. % oxide binder by total weight of the hydroisomerisation catalyst, for example about 5 to about 80 wt. % oxide binder, about 10 to about 70 wt. % oxide binder a, about 20 to about 70 wt. % oxide binder, for example about 25 to about 65 wt. % oxide binder by total weight of the hydroisomerisation catalyst.

In embodiments, the hydroisomerisation catalyst comprises:

- from about 5 to about 95 wt. % zeolite SSZ-91;
- from about 0.05 to about 2.0 wt. % of a Group 8-10 metal; and
- from about 5 to about 95 wt. % oxide binder by total weight of the hydroisomerisation catalyst.

In embodiments, the hydroisomerisation catalyst comprises:

- from about 30 to about 80 wt. % zeolite SSZ-91;
- from about 0.1 to about 1.5 wt. % of a Group 8-10 metal; and
- from about 20 to about 70 wt. % oxide binder by total weight of the hydroisomerisation catalyst.

Zeolite SSZ-91

Zeolite SSZ-91 and methods for making Zeolite SSZ-91 are described in U.S. Pat. No. 9,920,260. Zeolite SSZ-91 may also be referred to as SSZ-91 molecular sieve.

Zeolite SSZ-91 has a $SiO_2/Al_2O_3$ mole ratio (SAR) of 40 to 220. In embodiments, zeolite SSZ-91 has a $SiO_2/Al_2O_3$ mole ratio (SAR) of 40 to 200, for example, 70 to 200, 80 to 200, 70 to 180, 80 to 180, 70 to 160, 80 to 160, 70 to 140, 80 to 140, 100 to 160, 100 to 140, or 120 to 140. The SAR is determined by inductively coupled plasma (ICP) elemental analysis.

Zeolite SSZ-91 is composed of at least 70% polytype 6 of the total ZSM-48-type material present in the product. The proportion of polytype 6 of the total ZSM-48-type material present in the product is determined by DIFFaX simulation and as described by Lobo and Koningsveld in J. Am. Chem. Soc. 2012, 124, 13222-13230, where the disorder was tuned by three distinct fault probabilities. It should be noted the phrase "at least X %" includes the case where there are no other ZSM-48 polytypes present in the structure, i.e., the material is 100% polytype 6. The structure of polytype 6 is as described by Lobo and Koningsveld. (See, J. Am. Chem. Soc. 2002, 124, 13222-13230). In embodiments, the SSZ-91 material is composed of at least 80% polytype 6 of the total ZSM-48-type material present in the product. In embodiments, the SSZ-91 material is composed of at least 90% polytype 6 of the total ZSM-48-type material present in the product. The polytype 6 structure has been given the framework code *MRE by the Structure Commission of the International Zeolite Association.

Zeolite SSZ-91 has a morphology characterized as polycrystalline aggregates comprising crystallites collectively having an average aspect ratio in the range of 1 to 8. In embodiments, Zeolite SSZ-91 has a morphology characterized as polycrystalline aggregates comprising crystallites collectively having an average aspect ratio in the range of 1 to 6, for example 1 to 5, 1 to 4 or 1 to 3.

In embodiments, zeolite SSZ-91 has a morphology characterized as polycrystalline aggregates having a diameter of between about 100 nm and 1.5 μm, each of the aggregates comprising a collection of crystallites collectively having an average aspect ratio in the range of 1 to 8. In embodiments, Zeolite SSZ-91 has a morphology characterized as polycrystalline aggregates having a diameter of between about 100 nm and 1.5 μm, each of the aggregates comprising a collection of crystallites collectively having an average aspect ratio in the range of 1 to 6, for example 1 to 5, 1 to 4 or 1 to 3. As used herein, the term diameter refers to the shortest length on the short end of each crystallite examined.

Zeolite SSZ-91 is a substantially phase pure material. As used herein, the term "substantially phase pure material" means the material is completely free of zeolite phases other than those belonging to the ZSM-48 family of zeolites, or are present in quantities that have less than a measurable effect on, or confer less than a material disadvantage to, the selectivity of the material. Two common phases that co-crystalize with SSZ-91 are EUO-type molecular sieves such as EU-1, as well as Magadiite and Kenyaite. These additional phases may be present as separate phases, or may be intergrown with the SSZ-91 phase.

In embodiments, zeolite SSZ-91 comprises an EUO-type molecular sieve phase in an amount in the range of 0 to 7 wt. % by weight of the total zeolite SSZ-91 product. In embodiments, zeolite SSZ-91 comprises an EUO-type molecular sieve phase in an amount in the range of 0 to 5.0 wt. %, for example, 0 to 4.0 wt. %, or 0 to 3.5 wt. %. In embodiments, zeolite SSZ-91 comprises an EUO-type molecular sieve phase in an amount in the range of 0.1 to 7.0 wt. %, for example, 0.1 to 5.0 wt. %, 0.1 to 4.0 wt. %, or 0.1 to 3.5 wt. %. In embodiments, zeolite SSZ-91 comprises 0 to 7 wt. % EU-1, for example 0 to 5.0 wt. % EU-1, 0 to 4.0 wt. % EU-1, 0 to 3.5 wt. % EU-1, 0.1 to 7.0 wt. % EU-1, 0.1 to 5.0 wt. % EU-1, 0.1 to 4.0 wt. % EU-1, 0.1 to 3.5 wt. % EU-1, 0.1 to 2 wt. % EU-1, or 0.1 to 1 wt. % EU-1.

It is known that the ratio of powder XRD peak intensities varies linearly as a function of weight fractions for any two phases in a mixture: $(I\alpha/I\beta)=(RIR\alpha/RIR\beta)*(x\alpha/x\beta)$, where the RIR (Reference Intensity Ratio) parameters can be found in The International Centre for Diffraction Data's Powder Diffraction File (PDF) database (http://www.icdd.com/products/). The weight percentage of the EUO phase in zeolite SSZ-91 may therefore calculated by measuring the ratio between the peak intensity of the EUO phase and that of the SSZ-91 phase.

In embodiments, zeolite SSZ-91 comprises:

a silicon oxide ($SiO_2$) to aluminum oxide ($Al_2O_3$) mole ratio (SAR) of 40 to 220;

at least 70% polytype 6 of the total ZSM-48-type material;

0 to 7.0 wt. % of an EUO-type molecular sieve phase;

wherein the zeolite SSZ-91 has a morphology characterized as polycrystalline aggregates comprising crystallites collectively having an average aspect ratio of between 1 and 8.

In embodiments, zeolite SSZ-91 comprises:

a silicon oxide ($SiO_2$) to aluminum oxide ($Al_2O_3$) mole ratio (SAR) of 40 to 220;

at least 70% polytype 6 of the total ZSM-48-type material;

0 to 4.0 wt. % of an EUO-type molecular sieve phase;

wherein the zeolite SSZ-91 has a morphology characterized as polycrystalline aggregates comprising crystallites collectively having an average aspect ratio of between 1 and 8.

In embodiments, zeolite SSZ-91 comprises:

a silicon oxide ($SiO_2$) to aluminum oxide ($Al_2O_3$) mole ratio (SAR) of 40 to 220;

at least 70% polytype 6 of the total ZSM-48-type material;

0 to 3.5 wt. % of an EUO-type molecular sieve phase;

wherein the zeolite SSZ-91 has a morphology characterized as polycrystalline aggregates comprising crystallites collectively having an average aspect ratio of between 1 and 8.

In embodiments, zeolite SSZ-91 comprises:

a silicon oxide ($SiO_2$) to aluminum oxide ($Al_2O_3$) mole ratio (SAR) of 40 to 200;

at least 70% polytype 6 of the total ZSM-48-type material;

0 to 4.0 wt. % of an EUO-type molecular sieve phase;

wherein the zeolite SSZ-91 has a morphology characterized as polycrystalline aggregates comprising crystallites collectively having an average aspect ratio of between 1 and 8.

In embodiments, zeolite SSZ-91 comprises:

a silicon oxide ($SiO_2$) to aluminum oxide ($Al_2O_3$) mole ratio (SAR) of 70 to 200;

at least 70% polytype 6 of the total ZSM-48-type material;

0 to 4.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 80 to 200;

at least 70% polytype 6 of the total ZSM-48-type material;

0.1 to 7.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 80 to 200;

at least 70% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 80 to 200;

at least 70% polytype 6 of the total ZSM-48-type material;

0.1 to 4.0 wt. % EU-1;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 80 to 200;

at least 70% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 6

In embodiments, zeolite SSZ-91 comprises:

a silicon oxide ($SiO_2$) to aluminum oxide ($Al_2O_3$) mole ratio (SAR) of 80 to 160;

at least 70% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 70 to 160;

at least 70% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 70 to 200;

at least 80% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 80 to 200;

at least 80% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 6.

In embodiments, zeolite SSZ-91 comprises:

a silicon oxide ($SiO_2$) to aluminum oxide ($Al_2O_3$) mole ratio (SAR) of 80 to 200;

at least 80% polytype 6 of the total ZSM-48-type material;

0.1 to 7.0 wt. % of an EUO-type molecular sieve phase;

wherein the zeolite SSZ-91 has a morphology characterized as polycrystalline aggregates comprising crystallites collectively having an average aspect ratio of between 1 and 4.

In embodiments, zeolite SSZ-91 comprises:

a silicon oxide ($SiO_2$) to aluminum oxide ($Al_2O_3$) mole ratio (SAR) of 80 to 200;

at least 80% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 4.

In embodiments, zeolite SSZ-91 comprises:

a silicon oxide ($SiO_2$) to aluminum oxide ($Al_2O_3$) mole ratio (SAR) of 80 to 160;

at least 80% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 4.

In embodiments, zeolite SSZ-91 comprises:

a silicon oxide ($SiO_2$) to aluminum oxide ($Al_2O_3$) mole ratio (SAR) of 100 to 140;

at least 80% polytype 6 of the total ZSM-48-type material;

0.1 to 4.0 wt. % of an EUO-type molecular sieve phase;

wherein the zeolite SSZ-91 has a morphology characterized as polycrystalline aggregates comprising crystallites collectively having an average aspect ratio of between 1 and 4.

In embodiments, zeolite SSZ-91 comprises:

a silicon oxide ($SiO_2$) to aluminum oxide ($Al_2O_3$) mole ratio (SAR) of 100 to 140;

at least 80% polytype 6 of the total ZSM-48-type material;

0.1 to 4.0 wt. % of EU-1;

wherein the zeolite SSZ-91 has a morphology characterized as polycrystalline aggregates comprising crystallites collectively having an average aspect ratio of between 1 and 4.

Zeolite SSZ-91 synthesized as described herein can be characterized by their XRD pattern. The powder XRD lines of Table 1 are representative of as-synthesized zeolite SSZ-91. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al mole ratio from sample to sample. Calcination can also cause minor shifts in the XRD pattern. Notwithstanding these minor perturbations, the basic crystal lattice structure remains unchanged.

TABLE 1

Characteristic Peaks for As-Synthesized SSZ-91

| 2-Theta[(a)] | d-spacing (nm) | Relative Intensity[(b)] |
|---|---|---|
| 7.55 | 1.170 | W |
| 8.71 | 1.015 | W |
| 12.49 | 0.708 | W |
| 15.12 | 0.586 | W |
| 21.18 | 0.419 | VS |
| 22.82 | 0.390 | VS |
| 24.62 | 0.361 | W |
| 26.39 | 0.337 | W |
| 29.03 | 0.307 | W |
| 31.33 | 0.285 | W |

[(a)]±0.20

[(b)]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 2 are representative of calcined SSZ-91.

TABLE 2

Characteristic Peaks for Calcined SSZ-91

| 2-Theta[(a)] | d-spacing (nm) | Relative Intensity[(b)] |
|---|---|---|
| 7.67 | 1.152 | M |
| 8.81 | 1.003 | W |
| 12.61 | 0.701 | W |
| 15.30 | 0.579 | W |
| 21.25 | 0.418 | VS |
| 23.02 | 0.386 | VS |
| 24.91 | 0.357 | W |
| 26.63 | 0.334 | W |
| 29.20 | 0.306 | W |
| 31.51 | 0.284 | W |

[(a)]±0.20

[(b)]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Preparation of Zeolite SSZ-91

Reaction Mixture and Crystallization

In preparing zeolite SSZ-91, at least one organic compound selective for synthesizing molecular sieves from the ZSM-48 family of zeolites is used as a structure directing agent ("SDA"), also known as a crystallization template. The SDA useful for making zeolite SSZ-91 is represented by the following structure (1):

(1)

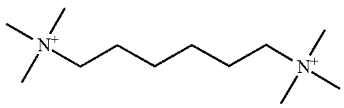

N,N,N,N′,N′,N′-Hexamethylhexamethylenediammonium or hexamethonium cation

The SDA cation is typically associated with anions which may be any anion that is not detrimental to the formation of the molecular sieve. Representative examples of anions include hydroxide, acetate, sulfate, carboxylate and halogens, for example, fluoride, chloride, bromide and iodide. In one embodiment, the anion is bromide.

In general, zeolite SSZ-91 is prepared by:

(a) preparing a reaction mixture containing (1) at least one source of silicon oxide; (2) at least one source of aluminum oxide; (3) at least one source of an element selected from Groups 1 and 2 of the Periodic Table; (4) hydroxide ions; (5) hexamethonium cations; and (6) water; and (b) maintaining the reaction mixture under crystallization conditions sufficient to form crystals of the molecular sieve.

The composition of the reaction mixture from which the zeolite SSZ-91 is formed, in terms of mole ratios, is identified below:

| Components | Mole Ratio |
|---|---|
| $SiO_2/Al_2O_3$ | 50-220 |
| $M/SiO_2$ | 0.05-1.0 |
| $Q/SiO_2$ | 0.01-0.2 |
| $OH/SiO_2$ | 0.05-0.4 |
| $H_2O/SiO_2$ | 3-100 |

wherein, (1) M is selected from the group consisting of elements from Groups 1 and 2 of the Periodic Table; and (2) Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 85-180 |
| $M/SiO_2$ | 0.1-0.8 |
| $Q/SiO_2$ | 0.02-0.1 |
| $OH/SiO_2$ | 0.10-0.3 |
| $H_2O/SiO_2$ | 10-50 |

wherein, (1) M is selected from the group consisting of elements from Groups 1 and 2 of the Periodic Table; and (2) Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 50-220 |
| $M/SiO_2$ | 0.05-1.0 |
| $Q/SiO_2$ | 0.01-0.2 |
| $OH/SiO_2$ | 0.05-0.4 |
| $H_2O/SiO_2$ | 3-100 |

wherein, (1) M is selected from the group consisting of elements from Groups 1 and 2 of the Periodic Table; and (2) Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 50-220 |
| $M/SiO_2$ | 0.05-1.0 |
| $Q/SiO_2$ | 0.02-0.1 |
| $OH/SiO_2$ | 0.05-0.4 |
| $H_2O/SiO_2$ | 3-100 |

wherein, (1) M is selected from the group consisting of elements from Groups 1 and 2 of the Periodic Table; and (2) Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 80-180 |
| $M/SiO_2$ | 0.05-1.0 |
| $Q/SiO_2$ | 0.02-0.1 |
| $OH/SiO_2$ | 0.05-0.4 |
| $H_2O/SiO_2$ | 3-100 |

wherein, (1) M is selected from the group consisting of elements from Groups 1 and 2 of the Periodic Table; and (2) Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 80-160 |
| $M/SiO_2$ | 0.05-1.0 |
| $Q/SiO_2$ | 0.02-0.1 |
| $OH/SiO_2$ | 0.1-0.4 |
| $H_2O/SiO_2$ | 3-100 |

wherein, (1) M is selected from the group consisting of elements from Groups 1 and 2 of the Periodic Table; and (2) Q is the structure directing agent represented by structure 1 above.

Sources useful herein for silicon include fumed silica, precipitated silica, silica hydrogel, silicic acid, colloidal silica, tetra-alkyl orthosilicates (e.g., tetraethyl orthosilicate), and silica hydroxides.

The reaction mixture can be formed containing at least one source of an elements selected from Groups 1 and 2 of the Periodic Table (referred to herein as M). In embodiments, the reaction mixture is formed using a source of an element from Group 1 of the Periodic Table. In embodiments, the reaction mixture is formed using a source of sodium (Na). Any M-containing compound which is not detrimental to the crystallization process is suitable. Sources for such Groups 1 and 2 elements include oxide, hydroxides, nitrates, sulfates, halides, oxalates, citrates and acetates thereof.

For each embodiment described herein, the molecular sieve reaction mixture can be supplied by more than one source. Also, two or more reaction components can be provided by one source.

The reaction mixture may be maintained at an elevated temperature until the crystals of the molecular sieve (zeolite SSZ-91) are formed. Zeolite hydrothermal crystallization is usually conducted under pressure, and usually in an autoclave so that the reaction mixture is subject to autogenous pressure and optionally stirring, at a temperature in the range of about 125° C. to about 200° C., for a suitable period, for example for about an hour to a few days, for example, from about 1 hour to about 10 days, from about 1 hour to about 9 days, from about 1 hour to about 8 days, from about 1 hour to about 7 days, or from about 1 hour to about 6 days, or from about 1 hour to about 5 days, or from about 1 hour to about 4 days, or from about 1 hour to about 3 days, or from about 1 hour to about 48 hours, or from about 1 hour to about 36 hours, or from about 1 hour to about 24 hours, or from about 1 hour to about 18 hours.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
|---|---|
| $SiO_2/Al_2O_3$ | 50-220 |
| $M/SiO_2$ | 0.05-1.0 |
| $Q/SiO_2$ | 0.01-0.2 |
| $OH/SiO_2$ | 0.05-0.4 |
| $H_2O/SiO_2$ | 3-100 |

wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
|---|---|
| $SiO_2/Al_2O_3$ | 50-220 |
| $M/SiO_2$ | 0.05-1.0 |
| $Q/SiO_2$ | 0.02-0.1 |
| $OH/SiO_2$ | 0.05-0.4 |
| $H_2O/SiO_2$ | 3-100 |

wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C., for example about 125° C. to about 180° C., or about 125° C. to about 160° C.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
|---|---|
| $SiO_2/Al_2O_3$ | 80-180 |
| $M/SiO_2$ | 0.05-1.0 |
| $Q/SiO_2$ | 0.05-0.2 |
| $OH/SiO_2$ | 0.05-0.4 |
| $H_2O/SiO_2$ | 3-100 |

wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C., for example about 125° C. to about 180° C., or about 125° C. to about 160° C.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
|---|---|
| $SiO_2/Al_2O_3$ | 80-160 |
| $M/SiO_2$ | 0.05-1.0 |
| $Q/SiO_2$ | 0.02-0.1 |
| $OH/SiO_2$ | 0.1-0.4 |
| $H_2O/SiO_2$ | 3-100 |

wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C., for example about 125° C. to about 180° C., or about 125° C. to about 160° C.

In embodiments, the crystallisation conditions include maintaining the reaction mixture at an elevated temperature in the range of about 125° C. to about 200° C., for example about 125° C. to about 180° C., about 125° C. to about 180° C., about 125° C. to about 170° C., about 125° C. to about 160° C.

The formation of amounts of the EUO phase is suppressed by selecting the optimal hydrogel composition, temperature and crystallization time which minimizes the formation of the EUO phase while maximizing the SSZ-91 product yield. The Examples provided in U.S. Pat. No. 9,920,260 provide guidance on how changes in these process variables minimize the formation of EU-1. A zeolite manufacturer with ordinary skill in the art will readily be able to select the process variables necessary to minimize the formation of EU-1, as these variables will depend on the size of the production run, the capabilities of the available equipment, desired target yield and acceptable level of EU-1 material in the product.

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. However, it has been found that if seeding is employed, the seeds must be very phase-pure SSZ-91 to avoid the formation of a large amount of a EUO phase. When used as seeds, seed crystals are added in an amount between 0.5% and 5% of the weight of the silicon source used in the reaction mixture.

The formation of Magadiite and Kenyaite is minimized by optimizing the hexamethonium bromide/$SiO_2$ ratio, controlling the hydroxide concentration, and minimizing the concentration of sodium as Magadiite and Kenyaite are layered sodium silicate compositions. The Examples provided in U.S. Pat. No. 9,920,260 provide guidance on how changes in gel conditions minimize the formation of EU-1.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

Post-Crystallization Treatment

Zeolite SSZ-91 can be used as-synthesized, but typically will be thermally treated (calcined). The term "as-synthesized" refers to the zeolite SSZ-91 in its form after crystallization, prior to removal of the SDA cation. The SDA can be removed by thermal treatment (e.g., calcination), for example in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by ozonation and photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

Zeolite SSZ-91 can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Where the molecular sieve formed is an intermediate molecular sieve, the target molecular sieve (e.g., zeolite SSZ-91) can be achieved using post-synthesis techniques such as heteroatom lattice substitution techniques. The target molecular sieve (e.g., zeolite SSZ-91) can also be achieved by removing heteroatoms from the lattice by known techniques such as acid leaching.

Zeolite SSZ-91 made from the process disclosed herein can be formed into a wide variety of physical shapes. Zeolite SSZ-91 can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite SSZ-91 can be extruded before drying, or, dried or partially dried and then extruded.

Zeolite SSZ-91 can be composited with other materials resistant to the temperatures and other conditions employed in organic conversion processes. Such matrix materials include active and inactive materials and synthetic or naturally occurring molecular sieves as well as inorganic materials such as clays, silica and metal oxides. Examples of such materials and the manner in which they can be used are disclosed in U.S. Pat. Nos. 4,910,006 and 5,316,753.

Preparation of the Hydroisomerisation Catalyst

The hydroisomerisation catalyst comprises zeolite SSZ-91. The zeolite SSZ-91 may be in its as synthesized or calcined form. In embodiments, the hydroisomerisation catalyst is formed from zeolite SSZ-91 in calcined form.

In embodiments, the hydroisomerisation catalyst is formed by compositing zeolite SSZ-91 (in as-synthesised or calcined form) with an oxide binder such as alumina. In embodiments, compositing zeolite SSZ-91 with an oxide binder comprises mixing zeolite SSZ-91 with an oxide binder (e.g. alumina) and extruding the product. The mixture of the molecular sieve (zeolite SSZ-91) and the oxide binder may be formed into a particle or extrudate having a wide range of physical shapes and dimensions. In embodiments, the extrudate or particle is dried and calcined prior to metal loading. In embodiments, the extrudate or particle is impregnated with a metal, e.g. a Group 2, 8, 9 and/or 10 metal (for example a Group 8-10 metal such as Pt) and then dried and calcined. In embodiments, the extrudate or particle is dried and calcined prior to metal loading.

In embodiments, the hydroisomerisation catalyst is prepared by:

compositing zeolite SSZ-91 and an oxide binder to form an extrudate base;

impregnating the extrudate base with an impregnation solution containing a metal, for example a Group 8-10 metal, to form a metal-loaded extrudate;

drying the metal-loaded extrudate; and calcining the dried metal-loaded extrudate.

In embodiments, the hydroisomerisation catalyst is formed by impregnating zeolite SSZ-91 with a solution containing a metal, for example Group 2, 8, 9 and/or 10 metal (for example a Group 8-10 metal such as Pt). In embodiments, the hydroisomerisation catalyst is formed by impregnating zeolite SSZ-91 in calcined form with a solution containing a Group 2, 8, 9 and/or 10 metal (for example a Group 8-10 metal such as Pt). In embodiments, the hydroisomerisation catalyst is formed by impregnating an extrudate base comprising zeolite SSZ-91 and an oxide binder.

In embodiments, the extrudate base is exposed to an impregnation solution (for example, soaked in an impregnation solution) containing a metal (Group 2, 8, 9 and/or 10 metal; for example, a Group 8-10 metal such as Pt), for 0.1 to 10 hours.

In embodiments, the extrudate base is dried (for example at a temperature in the range of about 100° F. (38° C.) to about 300° F. (149° C.) for about 0.1 to about 10 hours) and calcined (at a temperature in the range of about 600° F. (316° C.) to about 1200° F. (649° C.) for about 0.1 to about 10 hours) prior to impregnation.

In embodiments, the extrudate base formed by compositing zeolite SSZ-91 and an oxide binder is dried and calcined prior to impregnation. In embodiments, the dried and calcined extrudate base is impregnated with an impregnation solution to form a metal-loaded extrudate before being dried and calcined again to form the hydroisomerisation catalyst.

In embodiments, the impregnated zeolite SSZ-91, for example the impregnated extrudate base comprising zeolite SSZ-91, is dried at a temperature in the range of about 100° F. (38° C.) to about 300° F. (149° C.) for about 0.1 to about 10 hours.

In embodiments, the dried impregnated zeolite SSZ-91 (for example the dried metal-loaded extrudate) is calcined at a temperature in the range of about 600° F. (316° C.) to about 1200° F. (649° C.) for about 0.1 to about 10 hours. In embodiments, calcination takes place in air.

Hydrocarbon Feed

In embodiments, the hydrocarbon feed is selected from whole crude petroleum, reduced crudes, vacuum tower residua, cycle oils, synthetic crudes, gas oils, vacuum gas oils, foots oils, Fischer-Tropsch derived waxes, middle distillate stocks including gas oils, kerosenes, jet fuels, lubricating oil stocks, heating oils, heavy neutral feeds, hydrotreated gas oils, hydrocracked gas oils, hydrotreated lubricating oil raffinates, brightstocks, lubricating oil stocks, synthetic oils, Fischer-Tropsch synthesis oils, high pour point polyolefins (for example, polyolefins having a pour point of about 0° C. or above); normal alphaolefin waxes, slack waxes, deoiled waxes, microcrystalline waxes, residuum fractions from atmospheric pressure distillation processes, solvent-deasphalted petroleum residua, shale oils, cycle oils, animal derived fats, animal derived oils, animal derived waxes, vegetable derived fats, vegetable derived oils, vegetable derived waxes, petroleum wax, slack wax, and waxes produced in chemical plant processes.

In embodiments, the hydrocarbon feed is selected from whole crude petroleum, reduced crudes, vacuum tower residua, cycle oils, synthetic crudes, gas oils, vacuum gas oils, foots oils, and Fischer-Tropsch derived waxes.

In embodiments, the hydrocarbon feed is selected from: hydrotreated or hydrocracked gas oils; hydrotreated base oil raffinates; brightstocks; lubricating oil stocks; synthetic oils; foots oils; Fischer-Tropsch synthesis oils; high pour point polyolefins (for example, polyolefins having a pour point of about 0° C. or above); normal alphaolefin waxes; slack waxes; deoiled waxes; microcrystalline waxes; gas oils and vacuum gas oils; residuum fractions from an atmospheric pressure distillation process; solvent-deasphalted petroleum residua; shale oils, cycle oils; animal and vegetable derived fats, oils and waxes; petroleum and slack wax; and waxes produced in chemical plant processes. In embodiments, the hydrocarbon feed is selected from hydrotreated or hydrocracked gas oils, hydrotreated base oil raffinates, brightstocks, lubricating oil stocks, synthetic oils, foots oils, Fischer-Tropsch synthesis oils, high pour point polyolefins (for example, polyolefins having a pour point of about 0° C. or above), normal alphaolefin waxes, slack waxes, deoiled waxes and microcrystalline waxes.

In embodiments, the hydrocarbon feed is or comprises a heavy feed, for example heavy neutral (600N) and brightstock.

In embodiments, the hydrocarbon feed is a waxy feed, that is a hydrocarbon feed having a pour point of about 0° C. or above, for example a pour point of about 10° C. or above, or pour point of about 20° C. or above.

In embodiments, the hydrocarbon feed has a kinematic viscosity at 100° C. in the range of about 3 to about 30 cSt, for example, about 3.5 to about 15 cSt.

In embodiments, the hydrocarbon feed has a distillation temperature range of about 400° F. (204° C.) to about 1300° F. (704° C.), for example, about 500° F. (260° C.) to about 1100° F. (593° C.), or about 600° F. (316° C.) to about 1050° F. (566° C.). In embodiments, the hydrocarbon feed has a distillation temperature range of about 400° F. (204° C.) to about 1300° F. (704° C.) and a kinematic viscosity at 100° C. in the range of about 3 to about 30 cSt. In embodiments, the hydrocarbon feed has a distillation temperature range of about 500° F. (260° C.) to about 1100° F. (593° C.) and a kinematic viscosity at 100° C. in the range of about 3.5 to about 15 cSt.

In embodiments, the hydrocarbon feed has a 5% distillation temperature of at least about 700° F. (371° C.), for example at least about 750° F. (339° C.), or at least about 800° F. (426° C.). In embodiments, the hydrocarbon feed has a 10% distillation temperature of at least about 750° F. (399° C.), for example at least about 800° F. (426° C.), or at least about 840° F. (449° C.). In embodiments, the hydrocarbon feed has a 30% distillation temperature of at least about 850° F. (399° C.), for example at least about 900° F. (482° C.). The distillation temperature of the hydrocarbon feed may be determined in accordance with ASTM D 2887.

In embodiments, the hydrocarbon feed has a pour point of about 20° C. or above and a 10% distillation temperature of at least about 750° F. (399° C.).

In embodiments, the hydrocarbon feed comprises more than about 5% wax, more than about 10% wax, or more than about 15% wax. In embodiments the hydrocarbon feed contains from about 5% to about 30% wax. As used herein, the term "waxy hydrocarbon feeds" may include plant waxes and animal derived waxes in addition to petroleum derived waxes. As used herein, the term "wax" refers to a hydrocarbon component having a pour point above 0° C., for example above 20° C.

Process for Hydroisomerising a Hydrocarbon Feed

Described herein is a process for hydroisomerising a hydrocarbon feed. The process comprises:

- combining a hydrocarbon feed and a hydroisomerisation additive to provide a combined feed; and
- contacting the combined feed with a hydroisomerisation catalyst, wherein the hydroisomerisation additive is a substituted or unsubstituted nitrogen heterocycle, and the hydroisomerisation catalyst comprises zeolite SSZ-91.

In embodiments, combining a hydrocarbon feed and a hydroisomerisation additive comprises adding at least about 10 ppm of the hydroisomerisation additive to the hydrocarbon feed based on the weight of the hydrocarbon feed, for example at least about 20 ppm, at least about 30 ppm or at least about 50 ppm of the hydroisomerisation additive to the hydrocarbon feed based on the weight of the hydrocarbon feed. In embodiments, combining a hydrocarbon feed and a hydroisomerisation additive comprises adding up to about 500 ppm of the hydroisomerisation additive to the hydrocarbon feed based on the weight of the hydrocarbon feed, for example up to about 300 ppm, up to about 250 ppm, up to about 200 ppm, or up to about 150 ppm of the hydroisomerisation additive to the hydrocarbon feed based on the weight of the hydrocarbon feed. In embodiments, combining a hydrocarbon feed and a hydroisomerisation additive comprises adding from about 10 to about 500 ppm of the hydroisomerisation additive to the hydrocarbon feed based on the weight of the hydrocarbon feed, for example from about 10 to about 250 ppm, from about 20 to about 250 ppm, from about 20 to about 200 ppm, from about 50 to about 250 ppm, from about 50 to 200 ppm, from about 50 to 150 ppm, or from about 100 to 150 ppm, or from about 50 to 100 ppm of the hydroisomerisation additive to the hydrocarbon feed based on the weight of the hydrocarbon feed.

In embodiments, combining a hydrocarbon feed and a hydroisomerisation additive comprises adding the hydroisomerisation additive in an amount to provide nitrogen to the hydrocarbon feed in an amount of at least about 0.1 ppm based on the weight of the hydrocarbon feed, for example at least about 0.5 ppm, or at least about 1 ppm based on the weight of the hydrocarbon feed. In embodiments, combining a hydrocarbon feed and a hydroisomerisation additive comprises adding the hydroisomerisation additive in an amount to provide nitrogen to the hydrocarbon feed in an amount of up to about 50 ppm based on the weight of the hydrocarbon feed, for example up to about 30 ppm, up to about 25 ppm, up to about 20 ppm, or up to about 15 ppm based on the weight of the hydrocarbon feed. In embodiments, combining the hydrocarbon feed and the hydroisomerisation additive comprises adding the hydroisomerisation additive in an amount to provide nitrogen to the hydrocarbon feed in an amount in the range of about 0.1 to about 50 ppm based on the weight of the hydrocarbon feed, for example about 0.5 to about 25 ppm, or about 1 to about 20 ppm based on the weight of the hydrocarbon feed.

In embodiments, the combined feed formed by combining the hydrocarbon feed and the hydroisomerisation additive is fed into a hydroisomerisation reactor.

In embodiments, the hydrocarbon feed and the hydroisomerisation additive are fed independently into a hydroisomerisation reactor to form the combined feed in the hydroisomerisation reactor.

Hydroisomerisation of the hydrocarbon feed takes place in the presence of hydrogen. In an embodiment as shown in FIG. 1, a hydrocarbon feed 10 may be combined with a hydroisomerisation additive 11 to form a combined feed 13. The combined feed 13 may be fed into a hydroisomerisation reactor 14 along with hydrogen 12, the hydroisomerisation reactor 14 containing a hydroisomerisation catalyst 16. Within the reactor 14, the combined feed 13 may be contacted with the hydroisomerisation catalyst 16 under hydroisomerising conditions in the presence of hydrogen to provide a hydroisomersied stream 18.

In embodiments, the hydroisomerisation catalyst 16 is activated prior to the introduction of the hydrocarbon feed 10 (for example the combined feed 13) into the hydroisomerisation reactor 14. In embodiments, activation of the catalyst comprises reduction at a temperature of 450 to 650° F. (232 to 343° C.) for 1 to 10 hours.

In embodiments, the hydroisomerising conditions (for example the hydroisomerising conditions in reactor 14) include a temperature in the range of about 390° F. to about 800° F. (199° C. to 427° C.), for example, about 550° F. to about 700° F. (288° C. to 371° C.).

In embodiments, the hydroisomerising conditions (for example the hydroisomerising conditions in reactor 14) include a pressure in the range of about 15 to about 3000 psig (0.10 to 20.68 MPa gauge), for example about 100 to about 2500 psig (0.69 to 17.24 MPa).

In embodiments, the hydroisomerising conditions (for example the hydroisomerising conditions in reactor 14) include a feed rate of combined feed to the reactor containing the hydroisomerisation catalyst at a rate in the range from about 0.1 to about 20 $h^{-1}$ LHSV, for example from about 0.1 to about 5 $h^{-1}$ LHSV.

In embodiments, the hydroisomerising conditions (for example the hydroisomerising conditions in reactor 14) include a feed rate of the hydrogen feed to the reactor containing the hydroisomerisation catalyst at a rate in the range from about 0.1 to about 20 $h^{-1}$ LHSV, for example from about 0.1 to about 5 $h^{-1}$ LHSV.

In embodiments, the hydroisomerising conditions (for example the hydroisomerising conditions in reactor 14) include hydrogen and combined feed being fed to the reactor in a ratio from about 2000 to about 10,000 standard cubic feet $H_2$ per barrel combined feed (from about 360 to about 1800 $m^3$ $H_2/m^3$ feed, for example from about 2500 to about 5000 scf $H_2$ per barrel combined feed (from about 440 to about 890 $m^3$ $H_2/m^3$ feed).

In embodiments, the hydroisomerising conditions (for example the hydroisomerising conditions in reactor 14) include hydrogen and hydrocarbon feed being fed to the reactor in a ratio from about 2000 to about 10,000 standard cubic feet $H_2$ per barrel combined feed (from about 360 to about 1800 $m^3$ $H_2/m^3$ feed, for example from about 2500 to about 5000 scf $H_2$ per barrel hydrocarbon feed (from about 440 to about 890 $m^3$ $H_2/m^3$ feed).

In embodiments, hydroisomerising conditions (for example the hydroisomerising conditions in reactor 14) comprise:

- temperature in the range of about 390° F. to about 800° F. (199° C. to 427° C.), for example about 550° F. to about 750° F. (288° C. to 399° C.), or 570° F. to about 675° F. (299° C. to 357° C.);
- pressure in the range of about 15 to about 3000 psig (0.10 to 20.68 MPa gauge), for example about 100 to about 2500 psig (0.69 to 17.24 MPa);
- feed rate of combined feed to the reactor containing the hydroisomerisation catalyst at a rate in the range from about 0.1 to about 20 $h^{-1}$ LHSV, for example from about 0.1 to about 5 $h^{-1}$ LHSV; and
- hydrogen and combined feed fed to the reactor in a ratio from about 2000 to about 10,000 standard cubic feet $H_2$ per barrel combined feed (from about 360 to about 1800 $m^3$ $H_2/m^3$ feed, for example from about 2500 to about 5000 scf $H_2$ per barrel combined feed (from about 440 to about 890 $m^3$ $H_2/m^3$ feed).

In embodiments, the hydroisomerised stream (for example hydroisomerised stream 18) produced following contact of the combined feed and the hydroisomerisation catalyst, may undergo a hydrofinishing step. In embodiments, the hydroisomerised stream produced following contact of the combined feed and the hydroisomerisation catalyst may be fed into a hydrofinishing unit to be contacted with a hydrofinishing catalyst to form a hydrofinished hydroisomerised stream. A hydrofinishing step, may remove traces of any aromatics, olefins, color bodies, and the like from the base oil product. In embodiments, a hydrofinishing catalyst comprising an alumina support and a noble metal, for example palladium, or platinum in combination with palladium.

In embodiments, the hydroisomerised stream produced following contact of the combined feed and the hydroisomerisation catalyst, or the hydrofinished hydroisomerised stream, may be fed to a distillation unit. In embodiments, the hydroisomerised stream is fed to a distillation unit to provide a base oil having a pour point of −5° C. or lower.

In embodiments, the process for hydroisomerising a hydrocarbon feed provides a base oil having a pour point of −5° C. or lower. In embodiments, the process for hydroisomerising a hydrocarbon feed provides a base oil having a kinematic viscosity at 100° C. in the range of about 3 to about 12 cSt, for example about 4 to about 12 cSt, about 6 to about 12 cSt, about 8 to about 12 cSt, about 10 to about 12 cSt, about 4 to about 10 cSt, about 6 to about 10 cSt, about 8 to about 10 cSt, or about 10 cSt. The kinematic viscosity of the base oil at 100° C. may be determined in accordance with ASTM D 445.

In embodiments, the yield of a base oil produced by the processes described herein is improved by at least 1.0 wt. % compared to the process conducted in the absence of the hydroisomerisation additive. In embodiments, the yield of a base oil produced by the processes described herein is improved by at least 2.0 wt. % compared to the process conducted in the absence of the hydroisomerisation additive.

In embodiments, the process described herein provides a base oil with a yield of at least about 85%.

EXAMPLES

The following illustrative examples are intended to be non-limiting.

Summary of the Examples

The Examples below demonstrate that the processes and methods described herein efficiently provide a hydroisomerisation process which surprisingly provides an improved yield of a base oil product produced from a hydrocarbon feed.

Hydroisomerisation Catalyst

Example 1

Zeolite SSZ-91 was prepared in accordance with U.S. Pat. No. 9,920,260 (which is incorporated herein by reference) and as described herein.

The zeolite SSZ-91 product was then composited with alumina to provide a mixture containing 65 wt. % zeolite SSZ-91. The mixture was extruded, dried and calcined to form an extrudate base. The extrudate base was impregnated with a solution containing platinum. The impregnated catalyst was then dried in air before being calcined to provide the hydroisomerisation catalyst. The overall platinum loading of the hydroisomerisation catalyst product was 0.6 wt. %.

Hydroisomerisation of a Hydrocarbon Feed

The hydroisomerisation catalyst produced according to Example 1 were employed in the hydroisomerisation processes of Reference Example 2 and Examples 3 and 4 to hydroisomerise a hydrocarbon feed. The hydrocarbon feed employed in the hydroisomerisation processes of Reference Example 2 and Examples 3 and 4 was a heavy neutral feed having the properties set out in Table 3 below:

TABLE 3

| | |
|---|---|
| API Gravity | 29.6 |
| N, ppm | 1 |
| S, ppm | 32 |
| SIMDIST TBP (wt. %), ° F. | |
| TBP @0.5 | 716 |
| TBP @5 | 808 |
| TBP @10 | 842 |
| TBP @30 | 909 |
| TBP @50 | 950 |
| TBP @70 | 990 |
| TBP @90 | 1043 |
| TBP @95 | 1065 |
| TBP @99.5 | 1110 |

Each of the hydroisomerisation processes of Reference Example 2 and Examples 3 and 4 described below were carried out in a micro unit comprising a down flow fixed bed hydroisomerising reactor, a hydrofinishing reactor and a distillation unit. The hydroisomerising reactor was loaded with the hydroisomerisation catalyst of Example 1 in fixed beds. The hydrofinishing reactor was loaded with a Pd/Pt hydrofinishing catalyst in fixed beds.

Prior to the hydrocarbon or combined feeds being introduced to the hydroisomerising reactor in each of the processes of Reference Example 2 and Examples 3 and 4, the hydroisomerisation catalyst was activated by a standard reduction procedure as described herein.

Prior to the hydroisomerised feed being introduced to the hydrofinishing reactor in each of the processes of Reference Example 2 and Examples 3 and 4, the hydrofinishing catalyst was activated by a standard reduction procedure as described herein.

For each of the processes of Reference Example 2 and Examples 3 and 4: the hydroisomerising reactor was operated at a temperature of 600 to 650° F. (316 to 343° C.) and a pressure of 2100 psig; and the hydrofinishing reactor was operated at a temperature of 450° F. (232° C.) and a pressure of 2100 psig.

For each of the processes of Reference Example 2 and Examples 3 and 4, the hydrofinished product produced by the hydrofinishing reactor was passed to the distillation unit to provide a base oil having boiling points of 750° F. and above, and a pour point of −15° C.

Reference Example 2

The hydroisomerisation catalyst of Example 1 was placed in the hydroisomerisation reactor and activated by a standard reduction procedure as set out above. The hydrocarbon feed was fed through the hydroisomerisation reactor at a LHSV of 1.2, and hydrogen was fed to the hydroisomerisation reactor at a hydrogen to hydrocarbon feed ratio of about 3000 standard cubic feet $H_2$ per barrel hydrocarbon feed (about 540 $m^3$ $H_2/m^3$ feed). The hydrofinished product was passed to the distillation unit to separate fuel the base oil product.

Example 3

Example 2 was repeated except that before the hydrocarbon feed was passed to the hydroisomerisation reactor, 70 ppm N-ethylcarbazole was added to the hydrocarbon feed to produce a combined feed.

Example 4

Example 3 was repeated except that 140 ppm N-ethylcarbazole was added to the hydrocarbon feed to produce a combined feed.

Table 4 shows the performance results of the hydroisomerisation process as N-ethylcarbazole was added to the hydrocarbon feed in the processes of Reference Example 2 and Examples 3 and 4.

TABLE 4

| Process | Dosage of ethylcarbazole | Change in Base oil yield, wt. % compared to 0 ppm ethylcarbazole |
|---|---|---|
| Reference Example 2 | 0 ppm | — |
| Example 3 | 70 ppm | +2.0 |
| Example 4 | 140 ppm | +2.3 |

Surprisingly, it was observed that adding N-ethylcarbazole to the hydrocarbon feed was found to improve the base oil yield produced using the hydroisomerisation catalyst of example 1. After adding 70 ppm N-ethylcarbazole, the base oil yield is increased by 2 wt. %. When the N-ethylcarbazole concentration is increased to 140 ppm, the base oil yield is increased by 2.3 wt. %. Without wishing to be bound by theory, it is believed that the addition of the nitrogen heterocycle inhibits unselective side reactions, leading to improved base oil yield.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein. Reference should be made to the following numbered paragraphs and claims in determining the scope of the invention.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

For the avoidance of doubt, the present application is directed to the subject-matter described in the following numbered paragraphs:

1. A process for hydroisomerising a hydrocarbon feed, the process comprising:
   combining a hydrocarbon feed and a hydroisomerisation additive to provide a combined feed; and
   contacting the combined feed with a hydroisomerisation catalyst,
   wherein the hydroisomerisation additive is a substituted or unsubstituted nitrogen heterocycle, and the hydroisomerisation catalyst comprises zeolite SSZ-91.
2. A process for increasing the yield of a base oil produced by hydroisomerising a hydrocarbon feed, the process comprising:
   combining a hydrocarbon feed and a hydroisomerisation additive to provide a combined feed; and
   contacting the combined feed with a hydroisomerisation catalyst comprising zeolite SSZ-91 to form a base oil product,
   wherein the hydroisomerisation additive is a substituted or unsubstituted nitrogen heterocycle, and
   the yield of the base oil product is improved by at least 1.0 wt. % compared to the process conducted in the absence of the hydroisomerisation additive.
3. A process according to paragraph 1 or 2, wherein the hydroisomerisation additive has a DBE (double bond equivalent) number in the range of from 3 to 10.
4. A process according to any of paragraphs 1 to 3, wherein the hydroisomerisation additive is a substituted or unsubstituted aromatic nitrogen heterocycle.
5. A process according to any of paragraphs 1 to 4, wherein the hydroisomerisation additive has a molecular weight of less than about 600.
6. A process according to any of paragraphs 1 to 5, wherein the hydroisomerisation additive is selected from substituted or unsubstituted tricyclic fused-ring aromatic nitrogen heterocycles, substituted or unsubstituted bicyclic fused-ring aromatic nitrogen heterocycles and single ring aromatic nitrogen heterocycles.
7. A process according to any of paragraphs 1 to 6, wherein the hydroisomerisation additive is selected from substituted or unsubstituted: carbazoles, pyrroles, pyridines, indoles, quinolines and acridines.
8. A process according to any of paragraphs 1 to 7, wherein the hydroisomerisation additive is a substituted nitrogen heterocycle which is substituted with one or more substituents independently selected from: $C_{1-10}$ alkyl; hydroxyl; $C_{1-10}$ alkoxy; $C_{1-10}$ carboxyl; and —NR'R", wherein R' and R" are independently H or $C_{1-10}$ alkyl.
9. A process according to any of paragraphs 1 to 8, wherein the hydroisomerisation additive is a substituted or unsubstituted aromatic nitrogen heterocycle according to formula I:

(I)

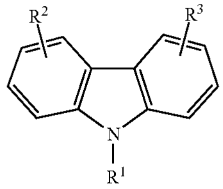

wherein
   $R^1$ is selected from hydrogen, $C_{1-10}$ alkyl, hydroxyl, $C_{1-10}$ alkoxy, $C_{1-10}$ carboxyl; and
   $R^2$ and $R^3$ are independently selected from hydrogen, $C_{1-10}$ alkyl, hydroxyl, $C_{1-10}$ alkoxy, $C_{1-10}$ carboxyl and —NR'R",
   where R' and R" are independently H or $C_{1-10}$ alkyl.
10. A process according to paragraph 9, wherein $R^1$ is selected from $C_{1-4}$ alkyl, and $R^2$ and $R^3$ are hydrogen.
11. A process according to any of paragraphs 1 to 10, wherein combining the hydrocarbon feed and the hydroisomerisation additive comprises adding from about 10 to about 500 ppm of the hydroisomerisation additive to the hydrocarbon feed based on the weight of the hydrocarbon feed.
12. A process according to any of paragraphs 1 to 11, wherein combining the hydrocarbon feed and the hydroisomerisation additive comprises adding the hydroisomerisation additive in an amount to provide nitrogen to the hydrocarbon feed in an amount in the range of about 0.1 to about 50 ppm based on the weight of the hydrocarbon feed.
13. A process according to any of paragraphs 1 to 12, wherein the hydrocarbon feed and hydroisomerisation additive are combined to form the combined feed before being fed into a hydroisomerisation reactor.
14. A process according to any of paragraphs 1 to 13, wherein the hydrocarbon feed has a 30% distillation temperature of at least about 900° F. (482° C.).
15. A process according to any of paragraphs 1 to 14, wherein the hydrocarbon feed has a pour point of about 0° C. or above.
16. A process according to any of paragraphs 1 to 15, wherein the hydroisomerisation catalyst further comprises a Group 8-10 metal.
17. A process according to any of paragraphs 1 to 16, wherein the combined feed is contacted with the hydroisomerisation catalyst and hydrogen under hydroisomerising conditions, the hydroisomerising conditions including a temperature in the range of about 550° F. to about 750° F. (288° C. to 399° C.).
18. A process according to paragraph 17, wherein the hydroisomerising conditions further comprise:
   pressure in the range of about 15 to about 3000 psig (0.10 to 20.68 MPa gauge);
   feed rate of combined feed to the reactor containing the hydroisomerisation catalyst at a rate in the range from about 0.1 to about 20 $h^{-1}$ LHSV; and hydrogen and combined feed fed to the reactor in a ratio from about 2000 to about 10,000 standard cubic feet $H_2$ per barrel combined feed (from about 360 to about 1800 $m^3$ $H_2/m^3$ feed).

19. A process according to any of paragraphs 1 to 18, wherein the hydroisomerised stream, produced following hydroisomerisation of the hydrocarbon feed by contacting the combined feed and the hydroisomerisation catalyst, is contacted with a hydrofinishing catalyst to provide a base oil having a pour point of about −5° C. or lower.
20. A process according to any of paragraphs 1 to 19, wherein the yield of a base oil produced by contacting the combined feed and the hydroisomerisation catalyst is improved by at least 1.0 wt. %, for example at least 2.0 wt. %, compared to the process conducted in the absence of the hydroisomerisation additive.
21. Use of a hydroisomerisation additive to improve the yield of a base oil produced by contacting a hydrocarbon feed and a hydroisomerisation catalyst, by combining the hydrocarbon feed with the hydroisomerisation additive to form a combined feed before contacting the combined feed and the hydroisomerisation catalyst, wherein the hydroisomerisation additive is a substituted or unsubstituted nitrogen heterocycle, and the hydroisomerisation catalyst comprises zeolite SSZ-91.
22. Use according to paragraph 21, wherein the base oil produced has a pour point of about −5° C. or lower.
23. Use according to paragraph 21 or 22, wherein the yield is improved by at least 1.0 wt. %, for example, at least 2.0 wt. %, compared to the process conducted in the absence of the hydroisomerisation additive.
24. Use according to any of paragraphs 21-23 wherein the hydroisomerisation additive is a carbazole, such as N-ethyl carbazole.
25. Use according to any of paragraphs 21-24, wherein the hydroisomerisation additive is added to the hydrocarbon feed in an amount of at least about 10 ppm.
26. A process for improving the yield of a base oil produced by contacting a hydrocarbon feed and a hydroisomerisation catalyst, the process comprising combining the hydrocarbon feed with a hydroisomerisation additive to form a combined feed before contacting the combined feed and the hydroisomerisation catalyst, wherein the hydroisomerisation additive is a substituted or unsubstituted nitrogen heterocycle, and the hydroisomerisation catalyst comprises zeolite SSZ-91.
27. The process according to paragraph 26, wherein the base oil produced has a pour point of about −5° C. or lower.
28. The process according to paragraph 26 or paragraph 27, wherein the yield is improved by at least 1.0 wt. %, for example, at least 2.0 wt. %, compared to the process conducted in the absence of the hydroisomerisation additive.
29. The process according to any of paragraphs 26-28 wherein the hydroisomerisation additive is a carbazole, such as N-ethyl carbazole.
30. The process according to any of paragraphs 26-29, wherein the hydroisomerisation additive is added to the hydrocarbon feed in an amount of at least about 10 ppm.

What is claimed is:

1. A process for hydroisomerising a hydrocarbon feed, the process comprising:

combining a hydrocarbon feed and a hydroisomerisation additive to provide a combined feed; and contacting the combined feed with a hydroisomerisation catalyst, wherein the hydroisomerisation additive is a substituted or unsubstituted nitrogen heterocycle according to formula I, (I)

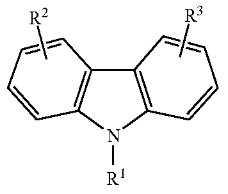

wherein, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen, $C_{1-10}$ alkyl, hydroxyl, $C_{1-10}$ alkoxy, $C_{1-10}$ carboxyl and —NR'R", where R' and R" are independently H or $C_{1-10}$ alkyl; and the hydroisomerisation catalyst comprises zeolite SSZ-91.

2. A process according to claim 1, wherein the hydroisomerisation additive has a DBE (double bond equivalent) number in the range of from 3 to 10.

3. A process according to claim 1, wherein the hydroisomerisation additive has a molecular weight of less than about 600.

4. A process according to claim 1, wherein $R^1$ is selected from $C_{1-4}$ alkyl, and $R^2$ and $R^3$ are hydrogen.

5. A process according to claim 1, wherein combining the hydrocarbon feed and the hydroisomerisation additive comprises adding from about 10 to about 500 ppm of the hydroisomerisation additive to the hydrocarbon feed based on the weight of the hydrocarbon feed.

6. A process according to claim 1, wherein combining the hydrocarbon feed and the hydroisomerisation additive comprises adding the hydroisomerisation additive in an amount to provide nitrogen to the hydrocarbon feed in an amount in the range of about 0.1 to about 50 ppm based on the weight of the hydrocarbon feed.

7. A process according to claim 1, wherein the hydrocarbon feed and hydroisomerisation additive are combined to form the combined feed before being fed into a hydroisomerisation reactor.

8. A process according to claim 1, wherein the hydrocarbon feed has a 30% distillation temperature of at least about 900° F. (482° C.).

9. A process according to claim 1, wherein the hydrocarbon feed has a pour point of about 0° C. or above.

10. A process according to claim 1, wherein the hydroisomerisation catalyst further comprises a Group 8-10 metal.

11. A process according to claim 1, wherein the combined feed is contacted with the hydroisomerisation catalyst and hydrogen under hydroisomerising conditions, the hydroisomerising conditions including a temperature in the range of about 550° F. to about 750° F. (288° C. to 399° C.).

12. A process according to claim 11, wherein the hydroisomerising conditions further comprise:

contacting the combined feed with the hydroisomerisation catalyst in a reactor under the following conditions:

pressure in the range of about 15 to about 3000 psig (0.10 to 20.68 MPa gauge);

feed rate of combined feed to the reactor at a rate in the range from about 0.1 to about 20 $h^{-1}$ LHSV; and hydrogen and combined feed to the reactor in a ratio from about 2000 to about 10,000 standard cubic feet $H_2$ per barrel combined feed (from about 360 to about 1800 $m^3$ $H_2/m^3$ feed).

13. A process according to claim 1, wherein the contacting of the combined feed with the hydroisomerisation catalyst produces a hydroisomerized stream, which is further contacted with a hydrofinishing catalyst to provide a base oil having a pour point of about −5° C. or lower.

14. A process according to claim 1, wherein the yield of a base oil produced by contacting the combined feed and the hydroisomerisation catalyst is improved by at least 1.0 wt. % compared to the process conducted in the absence of the hydroisomerisation additive.

15. A process for increasing the yield of a base oil produced by hydroisomerising a hydrocarbon feed, the process comprising:

combining a hydrocarbon feed and a hydroisomerisation additive to provide a combined feed; and contacting the combined feed with a hydroisomerisation catalyst comprising zeolite SSZ-91 to form a base oil product, wherein the hydroisomerisation additive is a substituted or unsubstituted nitrogen heterocycle according to formula I, (I)

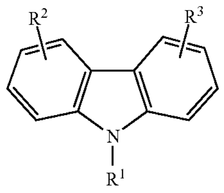

wherein, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen, $C_{1-10}$ alkyl, hydroxyl, $C_{1-10}$ alkoxy, $C_{1-10}$ carboxyl and —NR'R", where R' and R" are independently H or $C_{1-10}$ alkyl; and wherein the yield of the base oil product is improved by at least 1.0 wt. % compared to the process conducted in the absence of the hydroisomerisation additive.

16. A process for improving the yield of a base oil produced by contacting a hydrocarbon feed and a hydroisomerisation catalyst, the process comprising combining the hydrocarbon feed with a hydroisomerisation additive to form a combined feed and contacting the combined feed and the hydroisomerisation catalyst, wherein the hydroisomerisation additive is a substituted or unsubstituted nitrogen heterocycle according to formula I, (I)

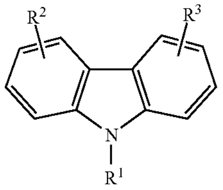

wherein, $R^1$ is selected from hydrogen, $C_{1-10}$ alkyl, hydroxyl, $C_{1-10}$ alkoxy, $C_{1-10}$ carboxyl; and $R^2$ and $R^3$ are independently selected from hydrogen, $C_{1-10}$ alkyl, hydroxyl, $C_{1-10}$ alkoxy, $C_{1-10}$ carboxyl and —NR'R", where R' and R" are independently H or $C_{1-10}$ alkyl; and the hydroisomerisation catalyst comprises zeolite SSZ-91.

17. The process according to claim 16, wherein the base oil produced has a pour point of about −5° C. or lower.

18. The process according to claim 16, wherein the yield is improved by at least 1.0 wt. % compared to the process conducted in the absence of the hydroisomerisation additive.

19. The process according to claim 16, wherein $R^1$ is hydrogen.

20. The process according to claim 16, wherein the hydroisomerisation additive is added to the hydrocarbon feed in an amount of at least about 10 ppm.

* * * * *